(No Model.)

J. S. BIRCH.
EXTENSION GUN WIPER.

No. 276,660. Patented May 1, 1883.

WITNESSES:
Wm. A. Low
O. H. Morgan

INVENTOR
John S. Birch
BY A. P. Thayer
ATTORNEY

UNITED STATES PATENT OFFICE.

JOHN S. BIRCH, OF NEW YORK, N. Y.

EXTENSION GUN-WIPER.

SPECIFICATION forming part of Letters Patent No. 276,660, dated May 1, 1883.

Application filed November 18, 1882. (No model.)

*To all whom it may concern:*

Be it known that I, JOHN S. BIRCH, a citizen of the United States, residing at New York city, in the county and State of New York, have invented new and useful Improvements in Extension Gun-Wipers, of which the following is a specification.

My invention consists of an improved method of connecting the joints of the sections of a telescopic extension gun-wiper rod to secure them substantially when extended for use; and it also consists of bands of elastic material applied to the rod for cushioning it against the sides of the barrel to prevent the scratching of one by the other, as hereinafter fully described, reference being made to the accompanying drawings, in which—

Figure 1:
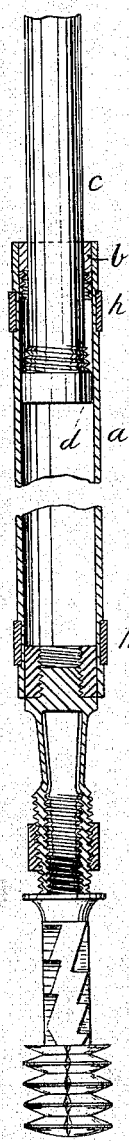
Figure 2:
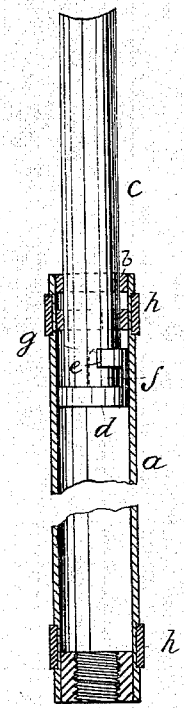
Figure 3:
Figure 4:

Figure 1 is a sectional elevation of a portion of a telescopic wiper-rod having joint-connections of my invention. Fig. 2 is a sectional elevation, showing a modification of the joint-connection. Fig. 3 is a detail of Fig. 2 in side elevation, and Fig. 4 is a side elevation of a complete wiper-rod with a part of the upper portion in section.

In the lower or larger section, $a$, of the telescopic rod I fit a bush, $b$, of tubing, that is equal in exterior diameter to the bore of said section and fits it snugly, and the bore or interior diameter of said bush is equal to and fits snugly around the exterior of the section $c$, and on the end of section $c$, I fit a collar, $d$, of same dimensions as bush $b$, the said collar being inserted in section $a$ before bush $b$ is, thereby connecting the two sections together, so that they may slide one upon the other freely, the joints being laterally close-fitting, and preventing the wabbling of one in the other; but for a further connection of said joints, so that the wiper may be turned around in the gun-barrel, I make the collar $d$ to screw firmly into the bush $b$, as in Fig. 1, or to connect with it by the equivalent bayonet-catch device represented in Figs. 2, 3, the collar $d$ having the vertical notch $e$ in its upper side and lateral notch $f$ in the middle, and the bush $b$ having the vertical notch $e$ in the lower side and lateral notch $f$ in the middle, so as to lock together by their respective prongs $g$. By these means the sections may be readily connected and disconnected by substantially rigid joints, both for lengthwise and torsional strains, and it will be noticed that by the use of the tubular bush and collar connections for the joints said joints can be made very cheaply, the said bushings and collars being fitted before being attached to the respective sections, and being soldered thereto.

I propose to apply cushioning-bands $h$, of leather, rubber, or other approved material, to protect the barrel from being scratched by the rod or the rod by the barrel, said bands being applied to the larger section $a$, which is the most liable to scratch and be scratched. The bands may spring into grooves of the rod to be secured; or they may be fastened by any other means.

Having thus described my invention, what I claim, and desire to secure by Letters Patent, is—

The improved joint for a sectional telescopic gun-wiper, consisting of the bush $b$, fitted in the end of section $a$, and internally screw-threaded or equivalently fitted for a portion of its length from the inner end, and the collar $d$ on the end of section $c$, within and fitting the bore of section $a$ for a portion of its length, and the other portion screwing or interlocking with bush $b$, substantially as described.

In witness whereof I have hereunto signed my name in the presence of two subscribing witnesses.

JOHN S. BIRCH.

Witnesses:
A. P. THAYER,
W. J. MORGAN.